United States Patent
Wang et al.

(10) Patent No.: US 8,831,809 B2
(45) Date of Patent: Sep. 9, 2014

(54) METHOD AND SYSTEM TO AVOID UNINTENDED ENGINE ON/OFFS FOR HYBRID VEHICLES

(75) Inventors: Qing Wang, Canton, MI (US); Hai Yu, Canton, MI (US); Ming Lang Kuang, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 13/541,128

(22) Filed: Jul. 3, 2012

(65) Prior Publication Data

US 2014/0012442 A1    Jan. 9, 2014

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| G06F 19/00 | (2011.01) |
| G06G 7/70 | (2006.01) |

(52) U.S. Cl.
USPC .......................................... 701/22; 701/112

(58) Field of Classification Search
USPC ...................................................... 701/22, 112
See application file for complete search history.

(56) References Cited

U.S. PATENT DOCUMENTS

| | | | |
|---|---|---|---|
| 6,466,860 B2 * | 10/2002 | Kaneko | .......................... 701/112 |
| 6,504,259 B1 | 1/2003 | Kuroda et al. | |
| 7,503,413 B2 | 3/2009 | Jiang et al. | |
| 7,806,210 B2 | 10/2010 | Proietty et al. | |
| 2009/0118880 A1 * | 5/2009 | Heap et al. | ....................... 701/22 |

* cited by examiner

*Primary Examiner* — Fadey Jabr
*Assistant Examiner* — Paula L Schneider
(74) *Attorney, Agent, or Firm* — Brooks Kushman P.C.; David B. Kelley (57) ABSTRACT

A system and method for controlling a hybrid electric vehicle powertrain having an engine defining one power source, and a traction motor and electrical storage device defining another power source include inhibiting a stopping and a starting of the engine based upon an unintended tip-out event and an unintended tip-in event, respectively. The total power demand and the available electric power are determined. The total power demand is filtered. The engine is prevented from being pulled-up or pulled-down based upon a difference between the total power demand and the filtered power demand being exceeding a threshold. However, if the difference exceeds the threshold, and if the available electric power exceeds the total power demand, then the engine is permitted to pull-up or pull-down.

6 Claims, 5 Drawing Sheets

METHOD AND SYSTEM TO AVOID UNINTENDED ENGINE ON/OFFS FOR HYBRID VEHICLES

TECHNICAL FIELD

The present disclosure relates to a hybrid vehicle and a control system for controlling the hybrid vehicle.

BACKGROUND

In a hybrid electric vehicle (HEV), either or both of an internal combustion engine and an electric traction motor are capable of supplying power to the wheels of the vehicle. One method of controlling the power supply to the wheels is to shut down or "pull-down" the engine during times that the engine is not needed to propel the vehicle in response to a power demand by a driver. When the driver power demand increases such that the electric motor cannot provide enough power to meet the demand, the engine may be activated or "pulled-up" to fulfill the power demand.

Unintentional pull-up/down of the engine may occur when the power demand is increased and then quickly decreased by the driver. This may occur in a situation, for example, in which the driver abruptly releases the accelerator pedal, and shortly thereafter abruptly depresses the pedal, or vice versa. In these situations, the engine may pull-up or pull-down unnecessarily. There is currently a need for a system that avoids unintentional pull-up and pull-down of the engine.

SUMMARY

According to one aspect of the present disclosure, a power distribution control system for a vehicle is provided. An engine is drivably connected to a generator. A traction motor is electrically connected to the generator. A controller or computer is configured to calculate a power demand and a filtered power demand. The computer is also configured to prevent the engine from transitioning between being activated and being deactivated based at least upon a difference between the power demand and the filtered power demand.

In various embodiments, a system or method for controlling a hybrid vehicle having an engine and a traction motor coupled to a driveline include inhibiting a stopping and a starting of the engine based upon an unintended tip-out event and an unintended tip-in event, respectively. The system or method may include inhibiting the stopping and starting of the engine based upon a difference between the power demand and a filtered power demand exceeding a threshold. The tip-in event may be defined by a rate of change of a power demand changing from negative to positive during a designated time period. The tip-out event may be based upon available electric power in an electric storage device coupled to the fraction motor.

In one embodiment, a method for controlling a hybrid vehicle having an engine and a traction motor coupled to a driveline includes starting the engine and maintaining the engine to actively output torque based upon a rate of change of a power demand changing from positive to negative and subsequently from negative to positive within a designated time period. The method may include maintaining the engine based upon a difference between the power demand and a filtered power demand exceeding a threshold. The method may also include maintaining the engine based upon available electric power in an electric storage device coupled to the traction motor.

Various embodiments according to the present disclosure provide one or more associated advantages. For example, systems and methods according to the present disclosure reduce unintended engine on/offs and may improve fuel economy or vehicle efficiency while enhancing drivability of a hybrid vehicle without compromising performance. Various embodiments also provide a fast response to intended engine on/offs, facilitate calibration, and may be implemented within the engine controller if desired.

The above advantages and other advantages and features will be readily apparent from the following detailed description of the preferred embodiments when taken in connection with the accompanying drawings.

DETAILED DESCRIPTION

Detailed embodiments of the present invention are disclosed herein. It is to be understood that the disclosed embodiments are merely exemplary of the invention that may be embodied in various and alternative forms. The Figures are not necessarily to scale; some features may be exaggerated or minimized to show details of particular components. Specific structural and functional details disclosed herein are therefore not to be interpreted as limiting, but merely as a representative basis for teaching one skilled in the art to variously employ the present invention. As those of ordinary skill in the art will understand, various features of the embodiments illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to systems or methods for detecting unintentional tip-in and tip-out to prevent respective engine pull-up and pull-down. However, the teachings of the present disclosure may also be used in other applications. Those of ordinary skill in the art may recognize similar applications or implementations with other vehicle configurations or technologies.

Figure 1:
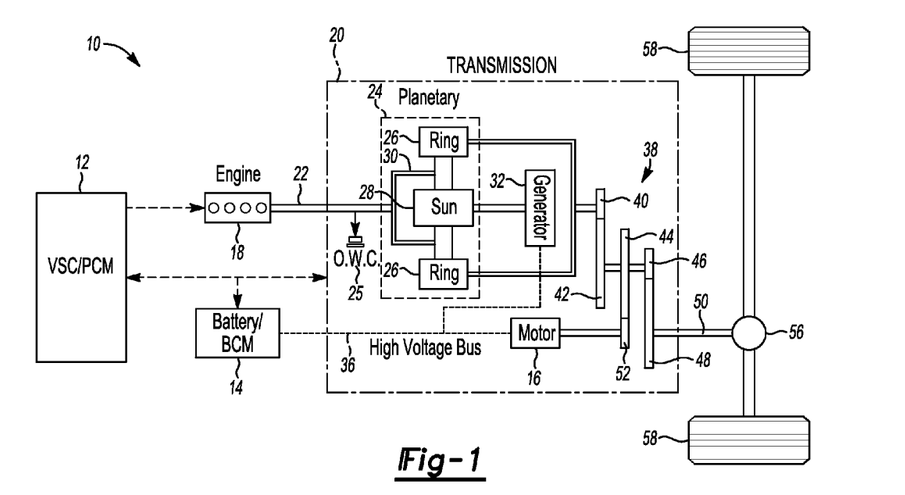
FIG. 1 is a schematic representation of a power-split hybrid electric vehicle enabled to utilize a pull-up/down strategy according to various embodiments of the present disclosure.

Referring to FIG. 1, a hybrid electric vehicle (HEV) includes a power-split powertrain 10. A vehicle system controller (VSC) and powertrain control module (PCM) 12 control an electric fraction battery 14. It should be understood that controller 12 may be one controller, or may be a system of controllers in a control area network (CAN) with a computer designed to allow several controllers to communicate with each other throughout the vehicle. The battery 14 has a two-way electrical connection, whereby it receives and stores electric energy and also supplies the energy to an electric traction motor 16. The controller 12 also controls the operation of an internal combustion engine (ICE) 18. Both the motor 16 and the engine 18 are capable of powering a transmission 20 that ultimately delivers torque to the wheels of the vehicle.

While the HEV of FIG. 1 is a power-split hybrid, it is contemplated that the present disclosure may also apply to a parallel-type hybrid in which an engine, a motor, and a transmission are connected in series by clutches that control which of the engine and/or motor drives the transmission. The present disclosure may apply to any hybrid vehicle that involves an engine and a motor, and the power-split powertrain 10 is illustrated as one possibility.

The engine 18 delivers power to a torque input shaft 22 that is connected to a planetary gear set 24 through a one way clutch 25. The planetary gear set 24 includes a ring gear 26, a sun gear 28, and a planetary carrier assembly 30. The input shaft 22 is driveably connected to the carrier assembly 30 to power the planetary gear set 24. The sun gear 28 is driveably connected to a generator 32. The generator 32 may be engaged with the sun gear 28, such that the generator 32 may either rotate with the sun gear 28, or not rotate with it. When the one way clutch 25 couples the engine 18 to the planetary gear set 24, the generator 32 generates energy as a reactionary element to the operation of the planetary gear set 24. Electric energy generated from the generator 32 is transferred to the battery 14 through electrical connections 36. The battery 14 also receives and stores electric energy through regenerative braking, in known fashion. The battery 14 supplies the stored electric energy to the motor 16 for operation. The portion of the power delivered from the engine 18 to the generator 32 may also be transmitted directly to the motor 16. The battery 14, motor 16, and generator 32 are each interconnected in a two-way electric flow path through electrical connections 36.

The vehicle may be powered by the engine 18 alone, by the battery 14 and motor 16 alone, or by a combination of the engine 18 with the battery 14 and motor 16. In a first mode of operation, the engine 18 is activated to deliver torque through the planetary gear set 24. The ring gear 26 distributes torque to step ratio gears 38 comprising meshing gear elements 40, 42, 44, and 46. Gears 42, 44, and 46 are mounted on a countershaft, and gear 46 distributes torque to gear 48. Gear 48 then distributes torque to a torque output shaft 50. In the first mode of operation, the motor 16 may also be activated to assist in the engine 18. When the motor 16 is active in assisting, gear 52 distributes torque to gear 44 and to the countershaft. In a second mode of operation, or EV mode, the engine 18 is disabled or otherwise prevented from distributing torque to the torque output shaft 50. In the second mode of operation, the battery 14 powers the motor 16 to distribute torque through the step ratio gears 38 and to the torque output shaft 50. The torque output shaft 50 is connected to a differential and axle mechanism 56 which distributes torque to traction wheels 58. The controller 12 controls the battery 14, engine 18, motor 16 and generator 32 in order to distribute torque to the wheels 58 in either the first mode of operation or the second mode of operation.

As previously described, there are two power sources for the driveline. The first power source is the engine 18, which delivers torque to the planetary gear set 24. The other power source involves only the electric drive system, which includes the motor 16, the generator 32 and the battery 14, where the battery 14 acts as an energy storage medium for the generator 32 and the motor 16. The generator 32 may be driven by the planetary gear set 24, and may alternatively act as a motor and deliver power to the planetary gear set 24.

While the vehicle is operated in the EV mode, the engine 18 may be pulled-up and started due to an increase in the overall power demand to provide sufficient power to drive the vehicle. In a power-split hybrid such as the vehicle of FIG. 1, a small amount of torque is sent from the planetary gear set 24 to start rotation of the engine. Fuel is combusted when the engine 18 is brought to a sufficient speed so that the engine 18 can work to provide torque through the transmission 20 to drive the wheels 58. When power from the engine 18 is no longer needed because enough power may be provided by the motor 16, the engine 18 is pulled-down. Engine pull-down may occur, for example, by disengaging the one way clutch 25 such that the engine 18 is disengaged with the planetary gear set 24, and/or by preventing fuel from entering the engine 18.

Engine pull-up/down (EPUD) may be accomplished in many different ways. For example, in a parallel-type hybrid in which an engine, a motor, and a transmission are connected in series by clutches, a clutch may disengage the engine from the motor to pull the engine down due to a decrease in overall power demand. In order to accomplish an engine pull-up due to an increase in overall power demand, the clutch engages the engine to the motor again. Many other ways of accomplishing EPUD in HEV's are known in the art, and FIG. 1 merely illustrates the structure of one such HEV.

The total power demand of the HEV is a factor in a control system that implements the EPUD strategy to decide when to pull the engine up and down. The total power demand is based on many factors that may include accelerator pedal position, brake pedal position, auxiliary load, and battery power request. As real-world driving contains frequent pedal fluctuations, the resultant total power request can be noisy depending on the smoothness of the driver's pedal motion. A tip-in event may indicate that additional power or vehicle acceleration is demanded. A tip-out event may indicate that less power or vehicle deceleration is demanded. For example, a tip-out event may be indicated by braking of the vehicle, lifting off the accelerator pedal, or combinations thereof. Driver change-of-mind may also occur, which refers to abrupt release (tip-out) of the accelerator pedal, followed shortly thereafter by an abrupt depression (tip-in) of the pedal, or vice versa. These quick fluctuations may broadly be referred to as "unintended or unintentional tip-ins" and "unintended or unintentional tip-outs." It should be understood that the term "unintended" tip-in and tip-out may also refer to events that the driver intentionally does (e.g., intentionally depresses the accelerator pedal), but the driver has a change-of-mind in a relatively small time frame, therefore making the entire event characterized as "unintended". Frequent oscillations in power demands and unintentional tip-ins/outs may trigger unnecessary EPUD actions.

Figure 2A:
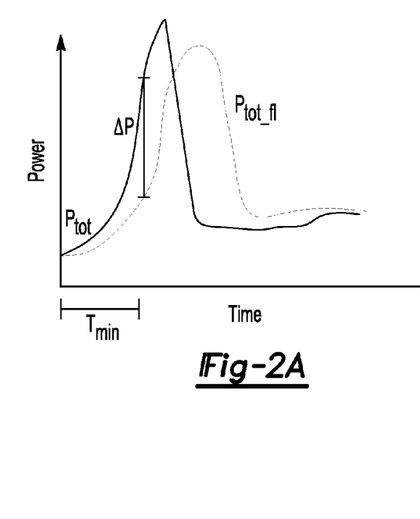
FIGS. 2A-2D are graphical representations of a total power demand compared with a filtered power demand over time for avoiding an unintentional pull-up/down of an engine according to various embodiments of the present disclosure.
Figure 2B:
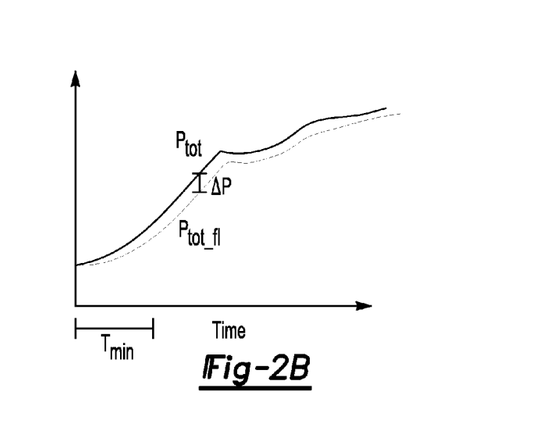

Referring to FIGS. 2A-2B, graphical representations are provided to illustrate tip-in scenarios and a system to detect unintended tip-ins. As will be described in detail, FIG. 2A illustrates an unintended tip-in, while FIG. 2B illustrates an intended tip-in. The total power demand ($P_{tot}$) represents changes in power demand due to any of the factors previously described, including the accelerator pedal position. The power demand is then filtered. One example of a filter includes low-pass filtering by an infinite impulse response (IIR) filter. The filtering may also be represented by the following:

$$P_{tot\_fl} = \frac{P_{tot}(t) + kP_{tot}(t-1) + kP_{tot}(t-2) + \ldots + kP_{tot}(t-n)}{n+1} \quad (1)$$

where $P_{tot\_fl}$ is the filtered total power demand, t is time, and k is an adjustable filter constant between 0 and 1 that is adjustable as a function of the rate of change of $P_{tot}$. The filter constant k may be adjustable based upon a calibration look-up table as a function of the rate of change of the power demand $$\left(\left|\frac{dP_{tot}}{dt}\right|\right).$$

For example, if the rate of change of $P_{tot}$ increases sharply due to accelerator pedal demand, the filter constant k may decrease.

The filtered total power demand ($P_{tot\_fl}$) may be computed in many ways to produce a smoothed and time-delayed output as compared to the unfiltered total power demand ($P_{tot}$). A difference ($\Delta P$) is then computed, which represents the difference between $P_{tot\_fl}$ and $P_{tot}$ ($\Delta P = |P_{tot} - P_{tot\_fl}|$). $\Delta P$ effectively indicates how rapid the tip-in transient is. For example, in FIG. 2B, $P_{tot}$ changes slowly and smoothly, and therefore $\Delta P$ also remains small. In contrast, in FIG. 2A, $P_{tot}$ changes rapidly during a tip-in, resulting in a relatively large $\Delta P$ value.

By computing $\Delta P$, a controller such as VSC/PCM 12 determines whether or not the tip-in was intentional or unintentional, and ultimately prevent engine pull-up if the tip-in was determined to be unintentional. After a minimum amount of time ($T_{min}$), if $\Delta P$ is less than a certain threshold, the tip-in may be flagged as an intentional tip-in. In contrast, if $\Delta P$ is greater than the threshold after $T_{min}$, the tip-in may be flagged as an unintentional tip-in. Greater detail of the determination of whether or not a tip-in is intentional will be disclosed with reference to FIGS. 4A-B.

Figure 2C:
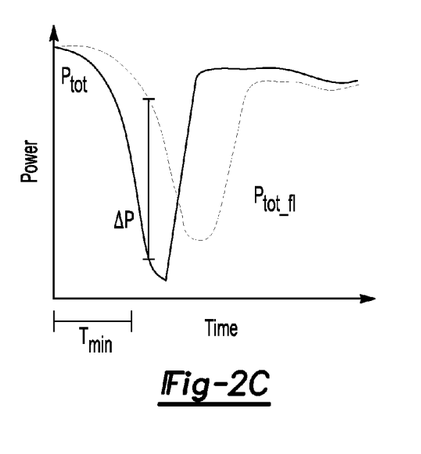
Figure 2D:
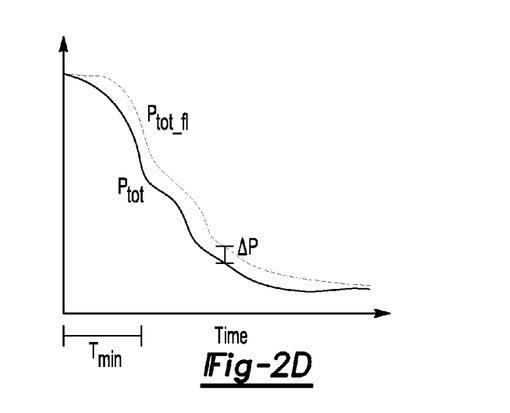

Referring to FIGS. 2C-2D, similar graphical representations are provided to illustrate typical tip-out scenarios and a system to detect unintended tip-outs. As in the case with the tip-ins, FIGS. 2C and 2D illustrate an unintended tip-out and an intended tip-out, respectively. As $P_{tot}$ sharply decreases, for example during a quick release of the accelerator pedal, $\Delta P$ increases. If $\Delta P$ is greater than a threshold after a minimum time, the tip-out may be flagged as an unintended tip-out and the VSC/PCM 12 may prevent the engine 18 from pulling-down.

Figure 3A:
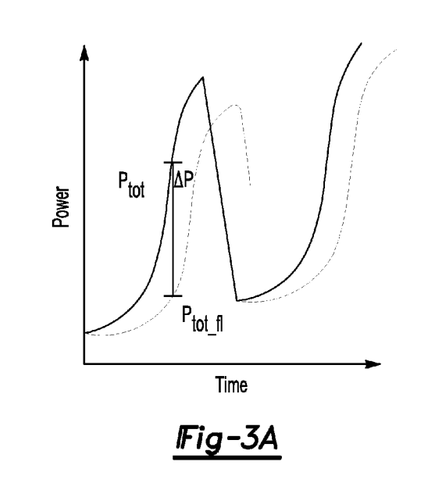
FIGS. 3A-3B are graphical representations of a total power demand and a filtered power demand illustrating the filtered power demand resetting at a new tip-in/tip-out event, according to various embodiments of the present disclosure.
Figure 3B:
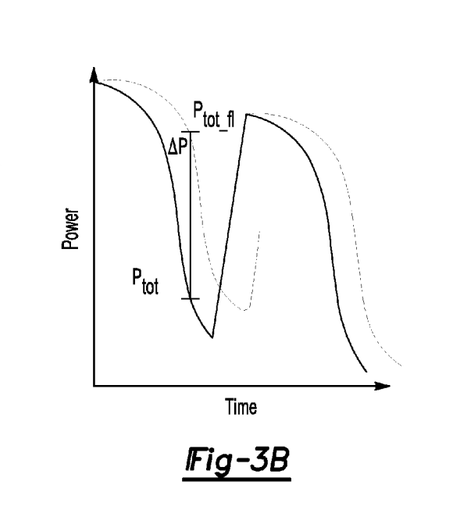

Referring to FIGS. 3A-3B, a tip-in and a tip-out are respectively illustrated to highlight the resetting of the filtered power demand. As shown, $P_{tot\_fl}$ is reset at each tip-in or tip-out event. For example, when the engine 18 is OFF and there is a sharp tip-in of a total power demand, the filtered total power demand resets at a subsequent tip-in event. In other words, the filtering starts and resets at the beginning of each tip-in event during a pull-up mode, and similarly starts and resets at the beginning of each tip-out event during a pull-down mode. This essentially resets the computation of $\Delta P$ at each tip-in and tip-out event. By doing so, a controller is enabled to analyze each tip-in and tip-out event individually to determine if each tip-in and tip-out event is intentional or unintentional.

Two separate signals may be provided to filter the total power demand. For example, one signal may be dedicated for tip-in events, while a separate signal is dedicated for tip-out events. The two separate signals enable more freedom to calibrate the tip-in and tip-out detection separately.

Figure 4A:
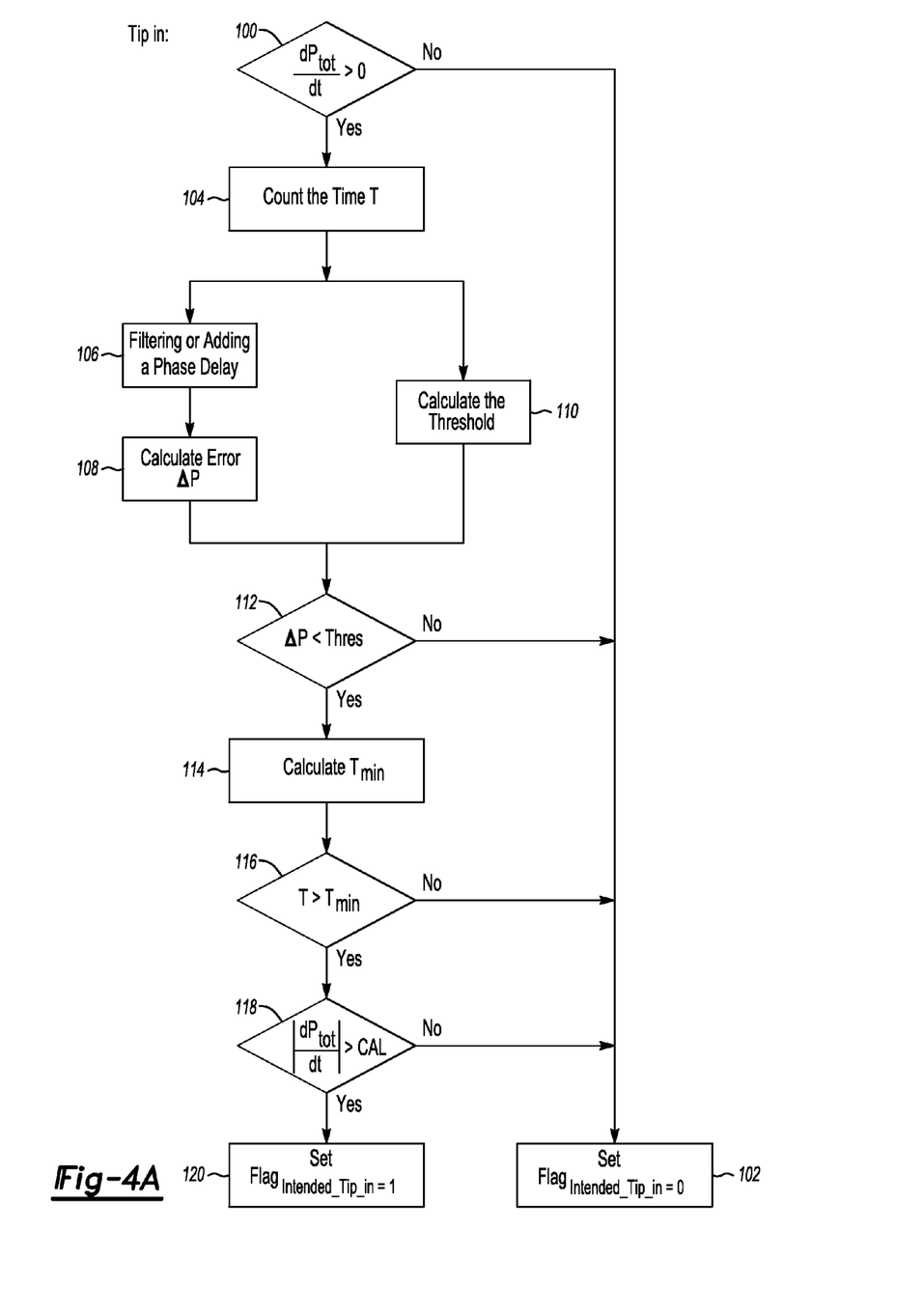
FIGS. 4A-4B are flow charts illustrating a system of avoiding unintentional pull-up/down of an engine during a tip-in/tip-out event according to various embodiments of the present disclosure.
Figure 4B:
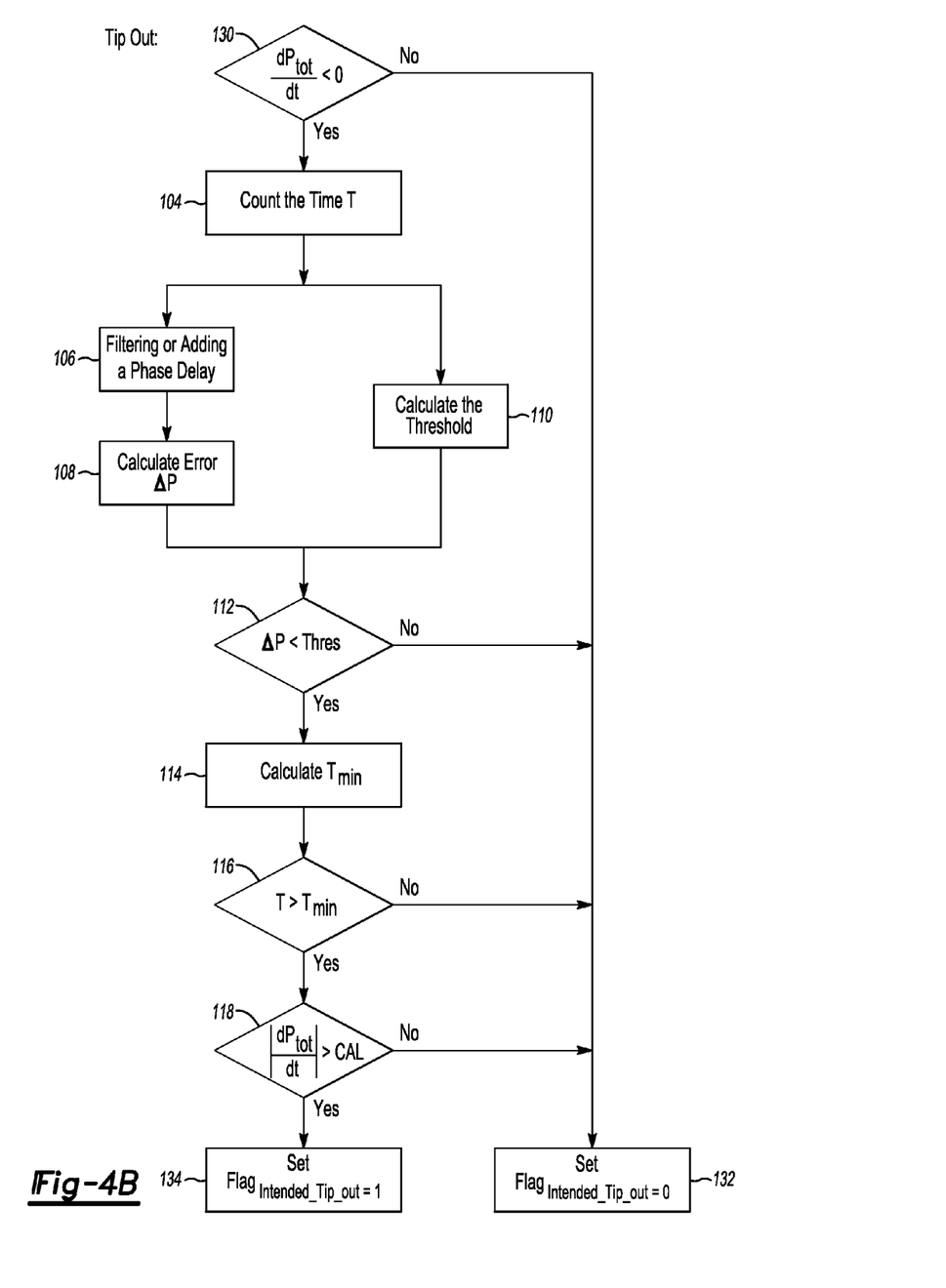

Referring to FIG. 4A, an algorithm is provided that is utilized by a controller to decide whether or not a tip-in event is intentional or unintentional. At 100, the rate of change of the total power demand ($P_{tot}$) is determined. If the rate of change of $P_{tot}$ is positive, a tip-in scenario is indicated and the algorithm proceeds. If the rate of change of $P_{tot}$ is not positive, then either the algorithm does not flag an intentional tip-in at 102, or the algorithm indicates a tip-out, in which case a tip-out algorithm operates as illustrated in FIG. 4B.

Referring back to FIG. 4A, at 104 a counter starts and the time is measured throughout the algorithm. At 106, the raw total power demand $P_{tot}$ signal is filtered by methods previously discussed, yielding a filtered total power $P_{tot\_fl}$. The filtering may reset at each new tip-in event determined, for instance, when $$\frac{dP_{tot}}{dt}$$

changes from negative value to a positive value indicating a new tip-in. The difference between $P_{tot}$ and $P_{tot\_fl}$ is determined at 108, which yields $\Delta P$. A threshold is determined at 110. Similar to the filter constant k, the threshold may be an adjustable value determined from a look-up table as a function of the rate of change of $P_{tot}$. For instance, if $P_{tot}$ is spiking quickly due to a sharp change in accelerator pedal position, the threshold may also increase.

Once the threshold is determined, $\Delta P$ is compared to the threshold at 112. If $\Delta P$ is less than the threshold, the algorithm proceeds to 114. Alternatively, if $\Delta P$ is not less than the threshold, then the tip-in is flagged as an unintended tip-in (Flag$_{Intended\_tip\_in}$=0) at 102, or simply not flagged as an intended tip-in at 102.

At 114, a minimum time threshold ($T_{min}$) is determined from a look-up table as a function of the rate of change of $P_{tot}$. For example, as the rate of change of $P_{tot}$ increases, $T_{min}$ decreases. A minimum waiting period is necessary in determining whether or not a tip-in is intentional or not because the filtering at 106 and consequently the $\Delta P$ at 108 reset at each tip-in event. Therefore, during the initial waiting period $T_{min}$, a small $\Delta P$ does not necessarily indicate a smooth and slow tip-in. At 116, the measured time is compared with the minimum time threshold $T_{min}$ to assure a minimum waiting time. As an optional final step at 118, the rate of change of $P_{tot}$ is compared to a calibration constant. When there is a rapid full pedal tip-in such that the rate of change in $P_{tot}$ is above the calibration constant, it is believed that the driver is actually intending the tip-in, and the system flags the tip-in as intended at 120.

Referring to FIG. 4B, a similar algorithm is illustrated with respect to a tip-out event. At 130, a tip-out event is indicated by the rate of change of $P_{tot}$ being negative. If the rate of change of $P_{tot}$ is not negative, then either the algorithm does not flag an intended tip-out at 132, or the algorithm indicates a tip-in, in which case the tip-in algorithm operates as illustrated in FIG. 4A. If the algorithm of FIG. 4B proceeds far enough, an intended tip-out is flagged at 134. The remaining steps of FIG. 4B are similar to those implemented with respect to a tip-in event in FIG. 4A.

By flagging tip-in and tip-out events as either intended or unintended, the system can prevent EPUD if the changes are unintentional. Preventing the engine from pulling up and down is disclosed with reference to FIGS. 5A-B.

Referring to FIGS. 2-4, the comparison of ΔP with a threshold may be used in determining whether or not a tip-in or tip-out is labeled as intended and may result in an engine pull up/down. Taking the tip-in of FIG. 2A as an example, ΔP remains above a threshold until $P_{tot}$ sharply changes direction again in a tip-out. ΔP remains above the threshold during the entire tip-in period, which indicates the tip-in is actually unintended because the power demand does not level off and $P_{tot}$ and $P_{tot\_fl}$ do not merge during the tip-in. It is not until the tip-out event that ΔP falls below the threshold, in which case the tip-in was never flagged as intended and the tip-out algorithm of FIG. 4B is implemented. In another embodiment, ΔP is measured throughout time, and must remain above the threshold for a minimal amount of time for the system to designate the tip-in or tip-out as intended.

To summarize, the tip-in system and algorithm starts only if the change rate of the power demand $P_{tot}$ is positive, implying a tip-in event. Thereafter, a counter starts, followed by the filtering of the raw signal $P_{tot}$ and the calculation of ΔP. A tip-in event will be considered as 'intended' (i.e., $Flag_{Intended\_Tip\_in}=1$) if all of the following conditions are met:

1. $\dfrac{dP_{tot}}{dt} > 0,$

2. After a calibration period Tmin, $P_{tot\_fl}$ and $P_{tot}$ converge close enough $\Big(\text{i.e., } \Delta P < \text{Threshold, and}$ 3. $\left|\dfrac{dP_{tot}}{dt}\right| > CAL,$ where CAL is a calibration constant.

The same is true for a tip-out event, except in a tip-out event, $dP_{tot}/dt<0$.

Figure 5A:
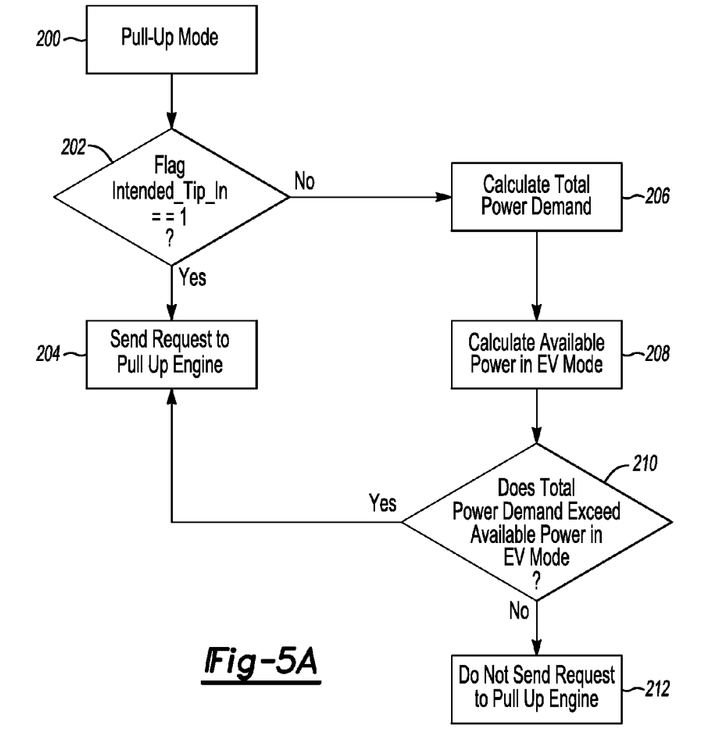
FIGS. 5A-5B are flow charts illustrating a system of engine pull-up/down based upon an intentional tip-in/tip-out according to various embodiments of the present disclosure.
Figure 5B:
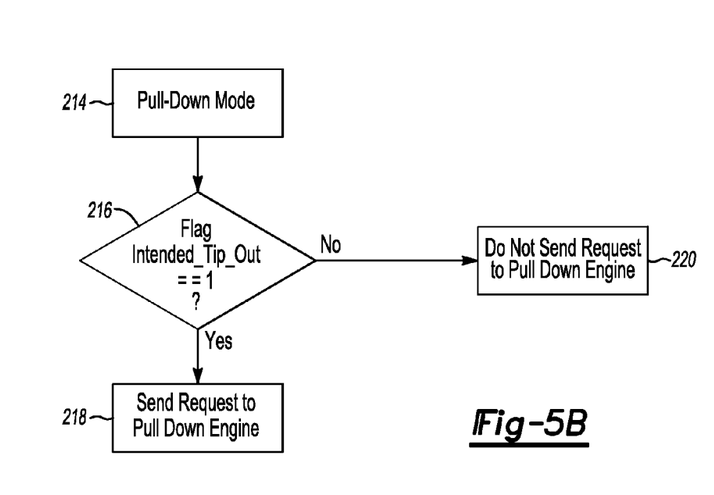

Referring to FIGS. 5A-B, a system is illustrated that prevents EPUD based on the flagged intended tip-ins and tip-outs. If, based on the system previously described, it has been determined that a tip-in or tip-out is unintentional, the EPUD prevention system shown in FIGS. 5A-B disables or inhibits unintended engine start/stop requests or events. This EPUD prevention system can be added or supplemented with any preexisting EPUD strategies in vehicle control systems.

FIG. 5A illustrates the system with respect to tip-in events. If total power demand increases to a certain level, the engine may be needed to be pulled-up in a pull-up mode at 200. At 202, it is determined whether there was a flagged intended tip-in at 120 (FIG. 4A). If the tip-in was determined to be intentional, then the control system is permitted to send a request to pull-up the engine at 204. In other words, the $Flag_{Intended\_Tip\_in}$ is an additional condition that has to be TRUE to qualify the tip-in as truly intentional. The engine then activates and supplements the motor power to fulfill the power demand.

However, if the tip-in was determined to be unintentional (i.e. $Flag_{Intended\_Tip\_in}$ is FALSE), then the control system will not allow a pull-up of the engine unless there is insufficient electric power available from the motor and battery. At 206, the total power demand is calculated. This is similar to the $P_{tot}$ determined previously. At 208, the controller calculates available power in the electric mode. This amount is reflective of how much power is available in the motor and/or battery to drive the vehicle in the EV mode for a certain desired time period. At 210, a comparison is made between the total power demand and the available power in EV mode. In the case of an unintentional tip-in, the engine is pulled-up only if the total power demand exceeds the available power in EV mode. In other words, the engine is not activated if the power demand can be fulfilled by the available EV power. If the available power in EV mode exceeds the total power demand, then at 212 the engine pull-up request is suppressed and the engine is not pulled-up.

Referring to FIG. 5B, a similar system is provided with respect to engine pull-down. If total power demand decreases to a certain level, the engine may be needed to be pulled-down in a pull-down mode at 214. At 216, it is determined whether or not there was an intended tip-out flagged at 134 (FIG. 4B). If the tip-out was indeed intended, the control system allows the controller to send an engine pull-down request at 218. If the tip-out was not intended, the control system will not send an engine pull-down signal at 220, and the engine will not change from ON to OFF. It is also contemplated that the engine will be prevented from pulling-down if the total power demand exceeds the available power in EV mode, similar to the control system in the pull-up mode.

As illustrated and described above, embodiments according to the present disclosure may provide various advantages related to prevention of unnecessary EPUD request by a vehicle controller. By detecting an unintentional tip-in/tip-out or change-of-mind by the driver, the frequency of EPUD is reduced. This ultimately reduces fuel consumption, and provides more satisfaction with drivability of the vehicle.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications.

What is claimed is:

1. A method implemented by at least one controller for controlling a hybrid vehicle having an engine and a traction motor coupled to a driveline, comprising:
   inhibiting the engine from starting and stopping based upon (i) a rate of change of a power demand over time, and (ii) a difference between the power demand and a filtered power demand at one time exceeding a threshold.

2. The method of claim 1, wherein the inhibiting is further based upon available electric power in an electric storage device coupled to the traction motor.

3. The method of claim 2, further comprising permitting the engine to start and stop based upon the available electric power exceeding the power demand.

4. A vehicle comprising:
   an engine for providing torque to wheels;
   a traction motor coupled to a driveline and capable of providing torque to the wheels; and
   a controller configured to inhibit the engine from starting and stopping based at least upon (i) a rate of change of a power demand over time, and (ii) a difference between the power demand and a filtered power demand at one time exceeding a threshold.

5. The vehicle of claim 4, wherein the controller is further configured to inhibit the engine from starting and stopping based upon available electric power in an electric storage device coupled to the traction motor.

6. The vehicle of claim 5, wherein the controller is further configured to permit the engine to start and stop based upon the available electric power exceeding the power demand.

* * * * *